United States Patent [19]

Conway

[11] 3,851,266

[45] Nov. 26, 1974

[54] SIGNAL CONDITIONER AND BIT SYNCHRONIZER

[76] Inventor: Patrick H. Conway, Univac Pk., Minneapolis, Minn. 55116

[22] Filed: Feb. 16, 1970

[21] Appl. No.: 14,846

Related U.S. Application Data

[60] Division of Ser. No. 660,159, July 27, 1967, Pat. No. 3,467,991, which is a continuation-in-part of Ser. No. 606,882, Jan. 3, 1967, abandoned.

[52] U.S. Cl. .................. 328/162, 328/127, 328/164
[51] Int. Cl. .......................................... H03b 1/00
[58] Field of Search ........... 328/164, 179, 127, 162; 307/235, 229

[56] References Cited

UNITED STATES PATENTS

| | | | |
|---|---|---|---|
| 3,218,559 | 11/1965 | Applebaum | 328/127 X |
| 3,356,955 | 12/1967 | Mohn et al. | 328/164 |
| 3,434,062 | 3/1969 | Cox | 328/127 X |

*Primary Examiner*—John W. Huckert
*Assistant Examiner*—B. P. Davis
*Attorney, Agent, or Firm*—Thomas J. Nikolai; Kenneth T. Grace; John P. Dority

[57] ABSTRACT

A signal conditioning circuit for use in a digital communication system for restoring the waveform of a received signal which may have been degraded during transmission. The incoming signal is applied to a variable gain amplifier, filter and direct current amplifier and the resulting output signal is compared both positively and negatively to predetermined reference values. Where the output signal deviates from these two references, a digital control signal is developed for adjusting the gain of the variable gain amplifier and the baseline of the direct current amplifier such that the output pulse conforms to a predetermined value.

5 Claims, 10 Drawing Figures

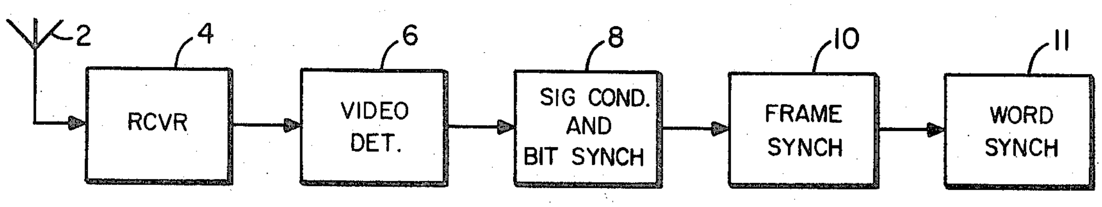
Fig. 1
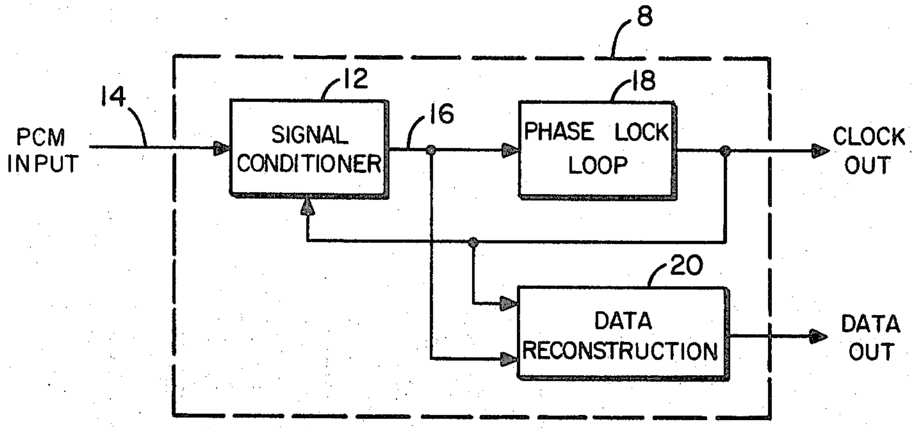
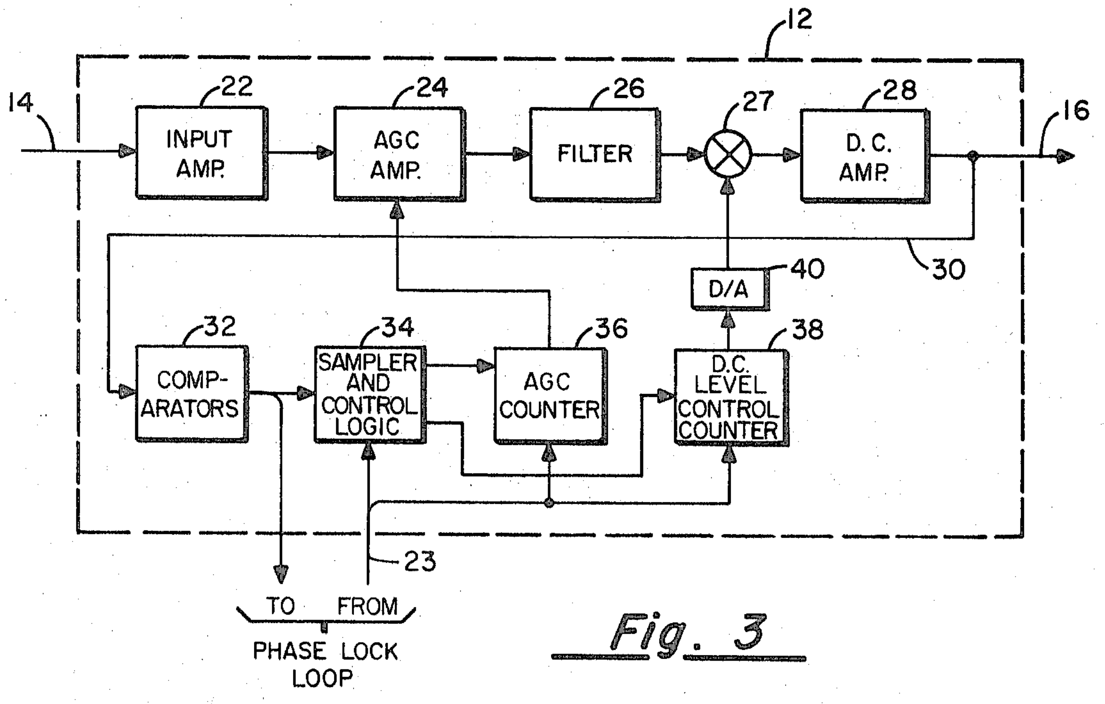
Fig. 3

COMPARATOR

SAMPLE AND CONTROL LOGIC

COUNTER (SIGNAL CONDITIONER)

SIGNAL CONDITIONER AND BIT SYNCHRONIZER

BACKGROUND OF THE INVENTION

FIELD OF THE INVENTION

This application is a division of application Ser. No. 660,159 filed July 27, 1967, now U.S. Pat. No. 3467991 which application is a continuation-in-part of commonly assigned copending application Ser. No. 606,882 filed Jan. 3, 1967 (now abandoned) and relates generally to digital type communication systems and more particularly to pulse code modulation communication systems in which the clock signal is regenerated at the transmitted bit rate and the data for pulse code modulation signals is reconstructed.

PROBLEM TO BE SOLVED

The analog voltage signals at various points to be monitored in a vehicle such as a satellite are converted into digital words (six to eight-bit quantization is commonly used) and multiplexed over a common channel to a receiver. Prior to their application to the analog-to-digital converter, the analog signals are conditioned and normalized to some range, such as 0–5 volts. Many of the points monitored may be digital discrete signals such as GO, NO-GO signals. The digital discrete signals and the digital output signals from the analog-to-digital converter form a serial bit stream which is applied as the modulation signal to a transmitter and the information is transmitted. One pass through all the data points is known as a frame and is preceded by a frame synch word.

Various code formats are in use in Pulse Code Modulation systems (hereinafter referred to simply as PCM) of which NRZ (non-return-to-zero) and split-phase are typical. The characteristics of NRZ signals are: (1) the DC level depends on the data and (2) the fundamental signal frequency band is from DC to one-half the bit-rate. The characteristics of split phase signals are: (1) the DC level is independent of the data and (2) the fundamental signal frequency band is from one-half the bit-rate to the bit rate. For NRZ, the state of a bit (0 or 1) is represented by a level, such as +V for 1 and −V for 0. No transitions or spikes occur between bits of like state. For split phase, the first half bit-time is the same as for NRZ, and a transition (from one level to the other) occurs in the center of the bit-time, the level for the second half bit-time being opposite that for the first half.

At the receiving station, the signal is picked up by a receiver and the signal is detected. At the detector output, the signal may not be a well defined square waveform. The transitions may be rounded due to channel bandwidth limitations, as unknown DC level may be present, and, since both the transmitting and receiving equipment may contain tape recorders, wow and flutter may be present. Noise may also be present.

Thus, apparatus is required whose function is to regenerate the bit-rate timing, or clock signal, and to reconstruct the data from this signal. This apparatus is a special type of analog-to-digital converter. Its output is supplied to digital equipment in which the frame synch is re-established and the data decommutated. The apparatus which regenerates the bit rate timing, or clock, and reconstructs the data is designated herein as a "Signal Conditioner and Bit Synchronizer."

The two most commonly known methods of reconstructing the data are (1) filter and sample, and (2) integrate and dump. A third possible method of data reconstruction is by cross correlation.

In the filter and sample method, the signal is filtered and sampled at the center of a bit-time for NRZ. If the sample is greater than the baseline of the signal, the data is considered to be a "1," and if less than the baseline, "0." If the signal is driven below the baseline by noise when it is actually a "1" (or vice versa) an error in detection results.

In the integration method, the signal is integrated over a bit period. If the result is positive (with respect to some reference), the data is considered to be a "1" and if negative, a "0." The "0" and "1" may be interchanged in the above descriptions.

In the cross correlation method, the incoming signal is multiplied by a reference and the product is integrated over $n$-bit times. If the reference is of the same waveform as the signal and the two are in phase, a maximum correlation function is obtained. Cross correlation has been mathematically proven to be an optimum method of extracting information from a noisy signal. Thus, a reduction in the probability of error (versus signal-to-noise ratio) in the reconstruction of PCM data can be realized by cross-correlating the data over several bit-times as compared to integrating over one bit-time. Basically this is due to the fact that the average value of the noise is zero, and the longer the integrating interval, the closer the integrated output will be to zero due to noise at the input.

DESCRIPTION OF THE PRIOR ART

The DC level or baseline of the incoming signal is unknown and varying. This baseline must be determined for proper data reconstruction. In prior art arrangements the baseline is detected by detecting the positive and negative peak envelopes of the incoming signal and taking the average of these peak detector outputs to be the baseline. The disadvantages of this technique are: (1) the peak detectors respond to noise spikes which give rise to an erroneous indication in the true baseline and (2) the DC level of the signal is dependent on the data content. For strings of like bits, the DC level of the signal approaches the peak level and the positive and negative peak detectors are unable to distinguish between the DC level due to the data and the extraneous DC levels which are intended to be rejected. The present invention is immune to noise peaks and does not respond to the message dependent DC level of the incoming signal. Thus, the above disadvantages are avoided.

The digital communication system described herein includes a signal conditioner, a phase-lock loop and a data reconstruction unit. Because the present invention is concerned chiefly with the signal conditioner portion, the following detailed description is devoted principally to that device and only limited discussion of the phase-lock loop and data reconstruction unit is deemed necessary. A more complete description of the phase-lock loop and data reconstruction units which may be utilized with the signal conditioner of this invention may be found in applicant's copending application Ser. No. 14,847 filed Feb. 16, 1970 which is a continuation-in-part of application Ser. No. 660,159 filed July 27, 1967 and now abandoned. The signal conditioner operates with sampling techniques and establishes a known DC baseline (0volts) and a known amplitude for a wide dynamic range of the received signal. In so doing it does not respond to noise peaks nor does it respond to the message dependent DC level of the received signal.

The phase lock loop also operates with sampling techniques to regenerate the clock signal associated with the received data signal and has the capability of reducing the effect of noise by averaging the perturbations of the baseline crossing caused by the noise.

The data reconstruction unit reconstructs the data by sampling, by integration or by cross-correlation.

Thus it is an object of the present invention to provide a signal conditioner that produces an output signal with a known amplitude for a wide dynamic range of the input signal and is not responsive to noise peaks.

It is also an object of the present invention to provide a signal conditioner which provides an output signal with a known DC baseline and does not respond to the message dependent DC level of the incoming signal.

BRIEF DESCRIPTION OF THE DRAWINGS

These and other more detailed and specific objects will be disclosed in the course of the following specification, reference being had to the accompanying drawings, in which:

FIG. 1 illustrates a typical PCM receiving system embodying the inventive Signal Conditioner and Bit Synchronizer;

FIG. 2 illustrates the components included in the Signal Conditioner and Bit Synchronizer;

FIG. 3 illustrates the details of the Signal Conditioner;

DESCRIPTION OF THE PREFERRED EMBODIMENT

GENERAL DESCRIPTION

GENERAL RECEIVING SYSTEM

Figure 4A:
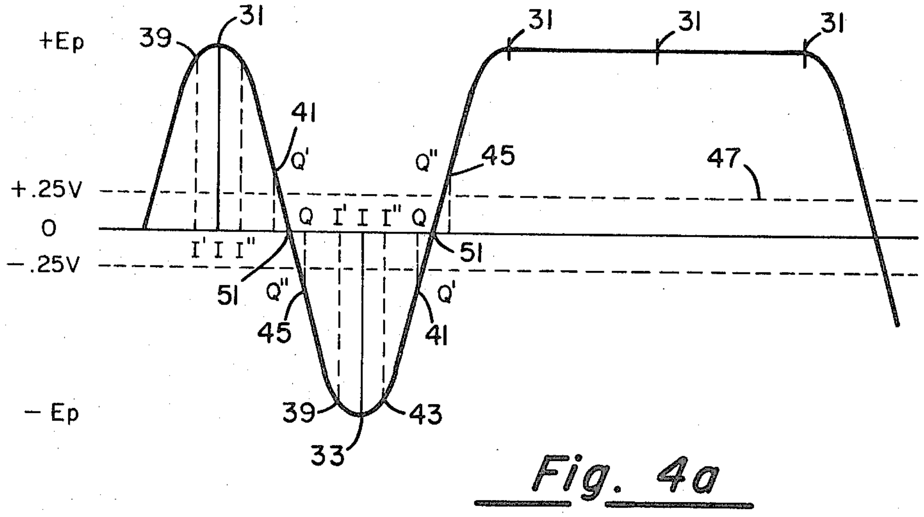
FIG. 4*a* and *b* illustrates with NRZ and split-phase waveforms how sampling techniques are performed in both the Signal Conditioner and the Phase Lock Loop.

A typical receiving system is shown in FIG. 1 wherein the PCM signal is received by antenna 2 (or transmission line) and coupled to receiver 4 where it is amplified and coupled to video detector 6. As stated previously, the output of the detector 6 is not a well defined square waveform and therefore is coupled to Signal Conditioner and Bit Synchronizer 8 whose function is to regenerate the clock signal and to reconstruct the data. It provides an output which is coupled to frame synchronizer 10 which detects the frame synch word and isolates each frame. The frame are coupled to word synchronizer 11 which isolates each data word.

The present invention relates generally to the Signal Conditioner and Bit Synchronizer 8 which is shown in detail in FIG. 2 and more specifically to the Signal Conditioner 12 which receives the detected or baseband signal on line 14 and produces an output on line 16 of fixed amplitude and a zero volt baseline. The output is coupled both to Phase Lock Loop 18 and Data Reconstruction Unit 20. Phase Lock Loop 18 produces a clock output signal which is utilized not only by the Signal Conditioner 12 and the Data Reconstruction Unit 20 but also by the frame and word synchronizers.

SIGNAL CONDITIONER

The purpose of signal conditioner 12 is to properly condition the input signal in order that it might be compatible with the Phase Lock Loop and Data Reconstruction Circuitry 18 and 20 respectively. As stated previously, prior art techniques require the detection of the positive and negative peaks of the signal to establish a baseline. Previous averaging or root mean square (RMS) techniques could not accommodate the wide variations in input frequency, message dependent DC level, DC biases and noise peaks without use of excessive amounts of components. Perturbations of the signal crossings and extraneous transitions due to noise do not seriously effect the operation of the phase-lock loop of the present invention while they may cause other types of mechanizations to rapidly lose synchronization.

Thus the Signal Conditioner 12 receives an input signal consisting of a serial bit stream which is bandwidth limited, i.e., the transitions are rounded, the DC level or baseline varies, and noise is present. Wow and flutter may also be present. Signal Conditioned 12 performs a linear operation on this input signal i.e., the output signal is a substantial replica of the input signal. Specifically the output is held at a constant amplitude over a 20db dynamic range of the input signal, and the baseline is held at 0 volts for input DC levels up to the peak-to-peak signal amplitude. Thus, the output signal is a replica of the input signal except for a change in amplitude and elimination of the DC bias level. This linear operation produces very little degradation of the signal-to-noise (S/N) ratio while nonlinear circuits, such as Schmitt trigger type signal conditioner cause considerable degradation of the S/N ratio. As will be described more fully hereinbelow, the signal conditioner also has provisions for accepting inputs of various impedance levels (50, 600, 5,000 ohms) AC or DC coupling, a manual DC level adjustment, 12db of manual gain control in 3 db steps, and a bank of low pass constant delay filters.

DETAILED DESCRIPTION

SIGNAL CONDITIONER

The input signal conditioner 12 is shown in block diagram form in FIG. 3. The input signal on line 14 is coupled to input amplifier 22 which includes conventional input buffer circuits for various input impedances, manually variable gain control circuits, provisions for AC or DC coupling, band switching circuits and signal voltage limiting circuitry.

The output of amplifier 22 is coupled to operational amplifier 24 which consists of an AGC amplifier and associated circuitry which maintains a constant output (± 0.1 db) over a 20db dynamic range of the input signal. The gain is controlled by changing the input and feedback resistors of operational amplifier 24 with field effect transistor (FET) switches. A nearly logarithmic response (linear in db) of gain versus control register state is obtained by switching pairs of resistors in parallel with the input and feedback resistors. The basic amplifier is flat to 10MHz and consists of a 2N3330 FET input stage, a 2N2369 transistor for the second stage, and a 2N1711 transistor for the output stage. The output of operational amplifier 24 is filtered by conventional filter bank 26 and coupled to conventional DC operational amplifier 28 via summing circuit 27.

The DC level output of amplifier 28 is controlled automatically. The baseline of the output signal is held at 0 volts (± one-tenth of a volt). The DC level is obtained by summing a DC control voltage with the output signal from the filter bank 26 so as to drive the baseline to 0 volts. The DC level control is added after the AGC circuit so that the DC resolution and response time is independent of the gain.

If the DC level control signal were injected at the input of the signal conditioner, the amplifiers would operate at 0 bias; however, the output DX resolution and response time would then be a function of the gain of AGC stage. This condition could be permitted to exist or logic circuitry could be provided to control the resolution of the DC level as a function of the gain of the AGC stage. However, by inserting the DC level control signal after the AGC sage, the DC resolution and the response time are independent of the gain.

The criteria for controlling the gain and the DC level are as follows: The amplitude and DC level of the signal are two independent parameters which describe the signal for a given format. The upper level and the lower level of the input signal are also two independent parameters which describe the signal. Thus if the upper and lower levels of the signal are held at given points, the amplitude and DC level are also held at given values.

Operation of the signal conditioner in general is as follows: Assume that the upper level of the input signal is used to control the gain, and the lower level is used to control the DC level (although the opposite could be true). The output of amplifier 28 on line 30 is coupled to comparator circuit 32 where the signal is compared with various voltage reference levels and the outputs therefrom is coupled to sampler and control logic circuitry 34. The output of the comparators 32 is sampled by logic 34 at the Nyquist rate, i.e., once per bit-time for NRZ or twice per bit time for split-phase. If a sample is positive and greater than some threshold representing the upper level, the gain is reduced by causing a reversible counter 36 to count in one direction. The counter controls the FET switches in amplifier 24 and varies the gain of the amplifier. In like manner, for positive samples less than this threshold, the counter is caused to count in the other direction and increase the gain of amplifier 24. The details of the preferred AGC amplifier are disclosed in applicant's commonly assigned abandoned application Ser. No. 606,721 filed Jan. 3, 1967 and need not be repeated here.

The output of sample circuit 34 is also coupled to DC level counter 38. If a sample is negative and greater (more negative) than some threshold representing the lower level, the DC level control counter 38 is caused to count in one direction which adds a positive bias to the output signal. If a negative sample is less (more positive) than this threshold, counter 38 is caused to count in the other direction which adds a negative bias to the output signal. The output state of the DC level control counter 38 is converted to a voltage by D/A converter 40 and coupled to summing circuit 27 to be summed with the signal output from filter network 26.

As described above, the AGC and DC level loops will hunt about their respective threshold levels, a least significant bit correction being applied during each bit period. Thus hunting could be eliminated if desired by incorporating a small "dead-hand" about the thresholds. Proper timing is provided by clock signals on line 23 from the phase lock loop.

In the process of sampling the signal described above, errors in the applied corrections may occur due to noise. The probability of consecutive errors being in the same direction is similar to that of getting consecutive heads (or tails) in tossing a coin. Thus over several bit-times the errors due to noise average out to zero.

The detailed operation of comparator 32 can be seen with reference to FIG. 4a for NRZ signals and 4b for split phase signals. FIG. 4c shows clock pulses produced by a free-running oscillator and representing a four phase clock. Clock pulse $C_1$ is at the beginning of a bit-time, clock pulse $C_3$ occurs at the half-point of the bit-time and clock pulse $C_4$ occurs at the three-quarters-point of the bit-time. For NRZ signals, the comparator output is sampled at clock pulse $C_3$ time. For split signals the comparator output is sampled at the clock pulse $C_2$ and $C_4$ times.

Thus if the signal is positive as shown at point 31 in FIG. 4a, clock pulse $C_3$ is the time at which the upper level is sampled. If the input signal is negative as shown at point 33 in FIG. 4a, clock pulse $C_3$ is again the time at which the lower level is sampled.

Figure 4B:
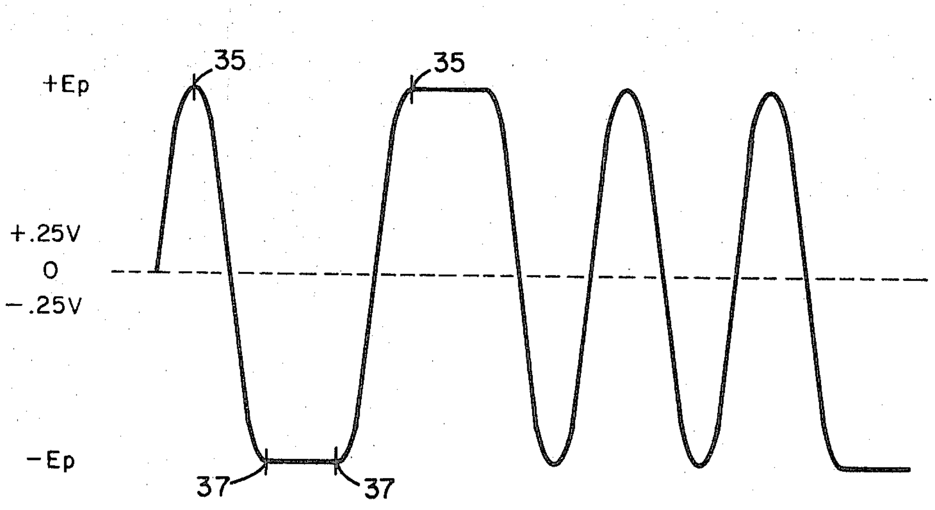

As shown in FIG. 4b, for split-phase signals, if the input signal is positive as shown by point 35, clock pulses $C_2$ and $C_4$ are the times at which the upper level is sampled. If the input signal is negative as shown at point 37, clock pulses $C_2$ and $C_4$ are also the times at which the lower level is sampled.

Thus, whenever a gain or DC level error is detected, reversible counters 36 or 38 respectively are caused to count up or down one count depending on the sign of the error. The output of the gain control counter 36 is used to control the FET switches of the operational amplifier counter 38 is linearly converted to a DC voltage by D/A converter 40 which voltage is summed with the output signal from filter 26 and applied as in input to amplfier 28 to control the output DC level apppearing as line 16. Obviously, the AGC control circuit and the DC level control circuit could be controlled by analog circuits instead of digital counters as shown. However, the digital counters are used in the preferred embodiment.

The reversible counters and the sampling circuitry provides digital filtering. Operation of the signal conditioner does not depend upon synchronization with the bit-rate. When no transitions occur between bits, the samples will have the same amplitude as for the insynch condition. After acquisition by the phase lock loop, the samples will be taken at the peak of the signal as desired.

It will be noted that the signal conditioner described is not responsive to noise peaks nor is it dependent on any specified maximum number of bit-times without transitions (for NRZ). It inherently detects the baseline of the signal independent of DC level changes due to the data mix. Due to application of digital concepts, wide bit-rate ranges may be covered without switching of component values. The only frequency-sensitive components are the input filters and the AC input coupling capacitors.

Since the AGC and DC level control loops are controlled by sampling techniques and only small corrections are applied each bit-time, they will be stable if, after a correction is made, they settle before the next sample is taken upon which to base a decision as to what the next correction shall be.

SIGNAL CONDITIONER CIRCUITS

AMPLIFIER

The preferred AGC amplifier 24 is of a type which produces a nearly logarithmic response (linear in db) of gain versus control register state. Such an amplifier is disclosed by applicant in his commonly assigned copending application Ser. No. 606,721 Filed Jan. 3, 1967 (now abandoned).

COMPARATORS

Figure 5:
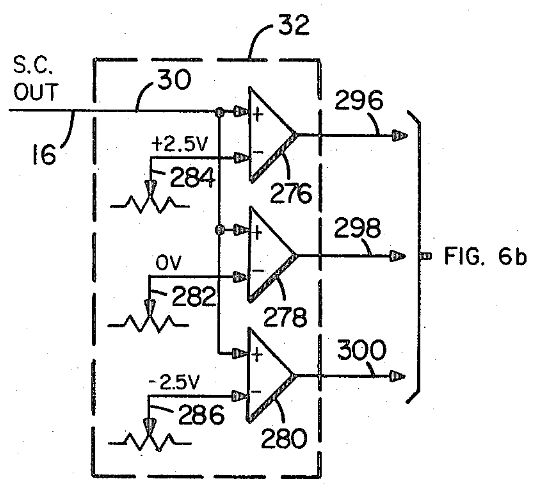
FIG. 5 is a circuit diagram of the comparators used in the Signal Conditioner and the Phase Lock Loop.

Comparator 32 shown in FIG. 3 is shown in detail in FIG. 5. Comparator 32 is utilized in the signal conditioner and comprises three high gain differential amplifiers 276, 278 and 280. The (+) signs on the amplifiers in FIG. 5 represent non-inverting inputs, and the (−) signs the inverting inputs. The signal conditioner output on line 16 in FIGS. 3 and 5 is coupled to the non-inverting side of each of the amplifiers 278, 278 and 280 via conductor 30. The inverting input of each differential amplifier is the reference voltage to which the input signal is to be compared. Differential amplifier 278 is used to determine whether the signal conditioner output is positive or negative. Adjustable arm 282 is adjusted to provide a reference voltage of 0 volts minus the offset voltage of the differential amplifier 278. Differential amplifier 276 is used to determine whether the input signal is greater than or less than the desired upper level of the signal conditioner output (+2.5 volts in the present example). Adjustable arm 284 is adjusted to provide a reference voltage of +2.5 volts minus the offset voltage of the differential amplifier 276. Differential amplifier 280 is used to determine whether the input signal is greater than or less than the desired lower level of the signal conditioner output (+2.5 volts in the present example). Adjustable arm 286 is adjusted to provide a reference voltage of −2.5 volts minus the offset voltage of differential amplifier 280. The outputs of amplifiers 276, 278, and 280 on lines 296, 298 and 300 are coupled to sampler and control logic 34. Voltage values disclosed above are given for purposes of example only and are not to be construed as limiting.

The output of each of amplifiers 276, 278 and 280, are positive (representing a binary 1) whenever the input signal is positive with respect to its associated reference or threshold voltage and zero (representing a binary 0) whenever the input signal is negative with respect to its associated reference or threshold voltage. The outputs may between the "9" and "1" levels for inputs very nearly equal to the associated thresholds. A bistable device such as a Schmitt trigger could be included in the output to prevent the output from remaining between "1" and "0" levels but this is not necessary for the purposes of this invention.

SAMPLER AND CONTROL LOGIC

As stated previously the upper level of the output signal from Signal Conditioner 12 is compared with an established reference voltage to produce gain control signals while the lower level of the signal is compared with an established reference voltage to probelm DC level control signals.

Figure 6A:
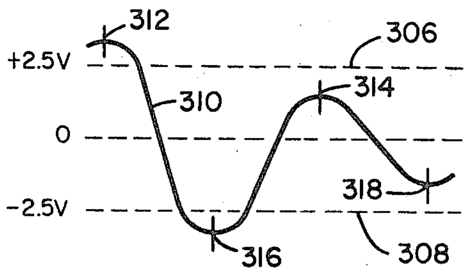
FIG. 6*a* is a diagram used to explain the operation of the Sample and Control Logic in the Signal Conditioner.

In FIG. 6a, the gain control reference voltage is represented by level 306 while the DC level control reference voltage is represented by level 308. These voltages are shown as +2.5 and −2.5 volts respectively but these values are for purposes of example only. An example of the signal to be sampled is shown by numeral 310. As will be seen from FIG. 6a, at the sample time represented by numeral 312, the input is greater than the established reference and thus the gain must be decreased. At the sample time represented by numeral 314, the input signal is positive but less than the established level 306 and thus the gain must be increased.

In like manner, at the sample represented by numeral 316, the input signal is more negative than DC refrence level 308 and thus a positive bias voltage must be added so as to cause the output of the signal conditioner to go more positive. Similarly, at the sample time represented by numeral 318, the input signal is negative but less negative than the DC reference level 308 and thus a negative bias voltage must be added so as to cause the output of the signal conditioner to go more negative.

Figure 6B:
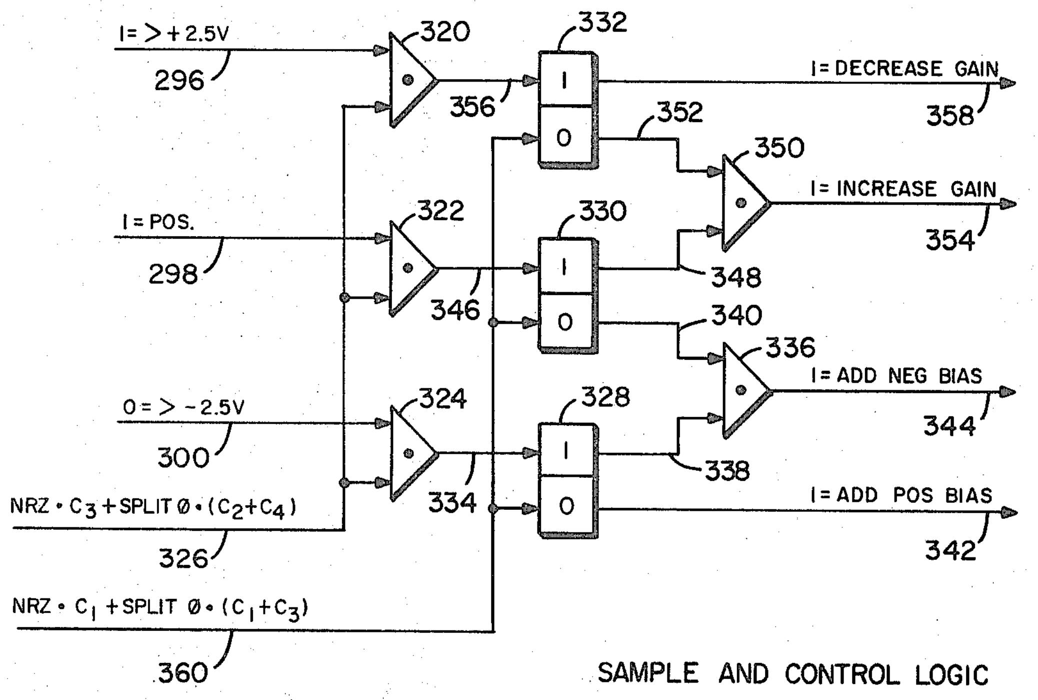
FIG. 6*b* illustrates the details of the Sample and Control Logic in the Signal Conditioner.
Figure 7A:
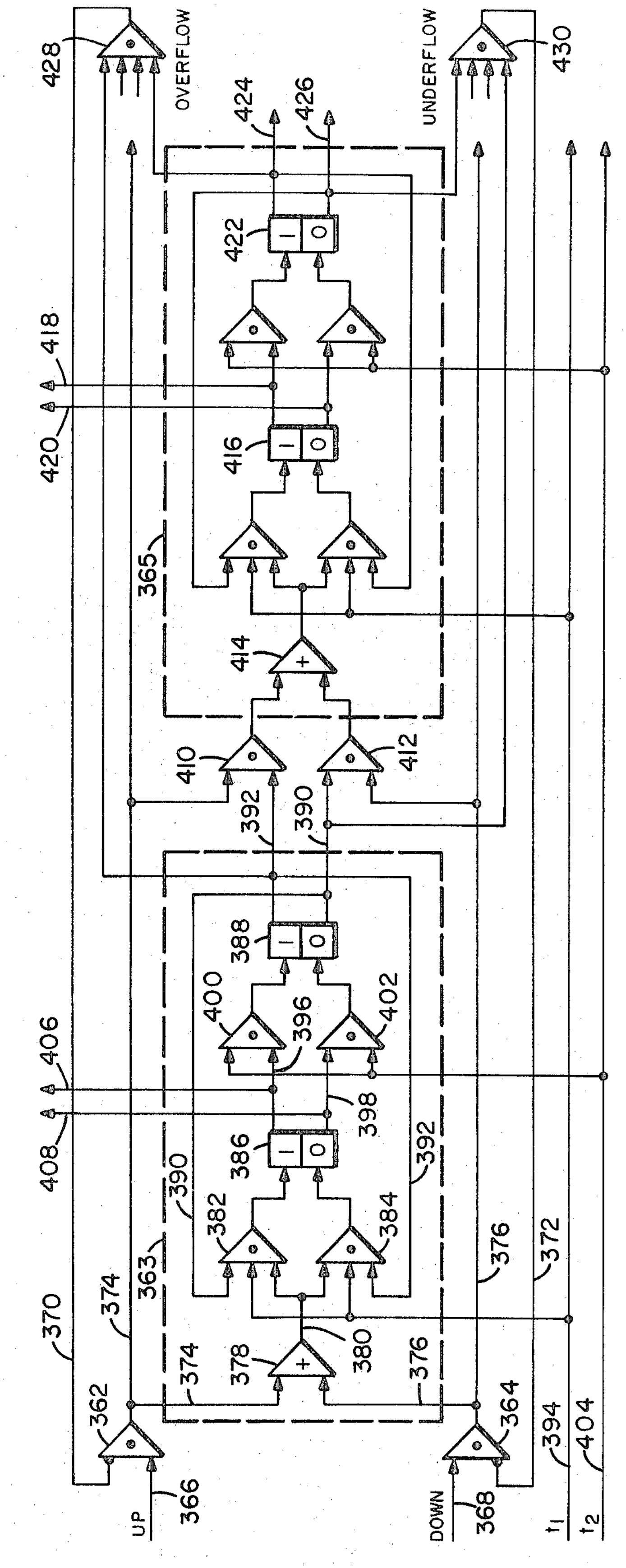
FIG. 7*a* illustrates the details of a typical counter stage used in the Signal Conditioners
Figure 7B:
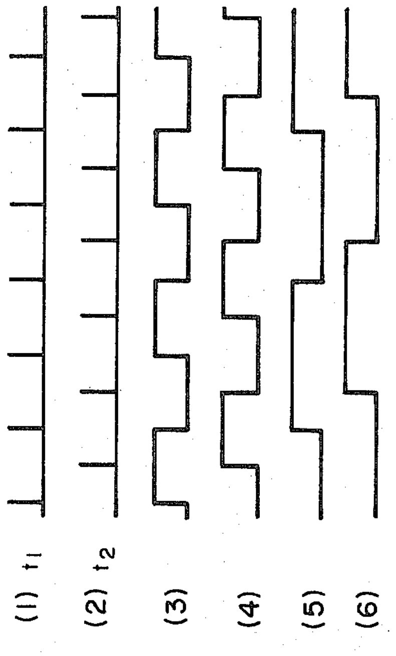
FIG. 7*b* shows the waveforms used to explain the counter stages shown in FIG. 7*a;*

Tee apparatus for producing the necessary control signals for performing the above described functions is shown in FIG. 6b. The output of differential amplifier 276 (shown in FIG. 5) on line 296 is coupled as one input to AND gate 320. Likewise each of the outputs of differential amplifiers 278 and 280 (shown in FIG. 5) on lines 298 and 300 respectively is coupled as one input to one of AND gates 322 and 324 respectively. The other input to each of these gates on line 326 provides the necessary clock pulses to cause sampling to occur at the proper times. As shown by FIG. 4a, 4b and 4c the proper sampling time for NRZ occurs with clock pulse $C_3$ while for split phase, the proper sampling time occurs with clock pulses $C_2$ and $C_4$. This is indicated by the Boolean Algebra expressions NRZ $\cdot$ $C_3$ + split phase $\cdot$ (C+ $C_4$).

Referring to FIG. 6b no signal will appear at the outputs of AND gates 320, 332, and 324 if the input signal is more negative than DC reference level 308 shown in FIG. 6a. Assuming initially that each of the flip flops 328, 330 and 332 are RESET, an output will appear from the "0" side of flip flop 328 on line 342 indicating that a positive bias must be added to the output of the signal conditioner.

If the input signal is negative but less negative than DC reference level 308, a pulse will appear at the output of AND gate 324 which is coupled to the SET input of flip flops 328 via line 334. This SETS the flip flop 328. The output of the "1" side of flip flop 328 is coupled as one input to AND gate 336 via line 338. Since flip flop 330 is RESET, it produces an output from its "0" side which is also coupled to AND gate 336 via line 340. AND gate 336 therefore produces an output on line 344 indicating that a negative bias must be addeto the output of the signal conditioner.

If the input signal is positive but less than the gain control threshold 306, both AND gates 322 and 324 produce outputs on lines 334 and 346 respectively. These outputs SET both flip flops 328 and 330. Flip flop 330 produces an output on line 348 which is coupled as one input to AND gate 350. Since flip flop 332 is in the RESET state, it produces an output from its "0"

side which is coupled as the other input to AND gate 350 via line 352. Thus AND gate 350 produces an output on line 354 which indicates that the gain must be increased.

If the input signal is more positive than gain controlled threshold 306, AND gates 320, 322 and 324 produce outputs on lines 334, 346, and 356 respectively. These outputs SET flip flops 328, 330 and 332. Flip flop 332 produces an output from its "1" side on line 358 which indicates that the gain must be decreased.

The control signals on lines 342, 344, 354 and 358 remain long enough for the indicated correction to be made to the appropriate loop. Flip flops 328, 330 and 332 are then RESET by pulses on line 360 prior to the next sample pulse present on line 326. For NRZ, clock pulse $C_1$ is used as the RESET pulse while for split phase, clock pulses $C_1$ and $C_3$ are used. This is shown by the Boolean expression NRZ· $C_1$ + split phase · $(C_1 + D_3)$.

COUNTERS

Reversible (up - down) counters are used in the signal conditioner to accumulate loop correction signals. The counters are not of the ripple type whereby a pulse is applied to the least significant bit LSB causing it to change state and is then passed to the next higher bit if the given bit is a "1" for an UP counter or "0" for a DOWN counter. In the present counters, all appropriate stages of the counter change states simultaneously when a count pulse is applied. The logic criteria for counting is to complement the LSB and to complete other bits if all lower significant bits are "1's" for UP counts or "0" for DOWN counts. A two phase clock signal is required. The first phase $t_1$, causes a first flip flop of each stage to store a count according to the above described logic. The state of the first flip flop in each stage of the counter is shifted into a second flip flop in each stage at phase, $t_2$, time. The outputs of this second flip flop are used to control the inputs to the first flip flop of the counter stage such that qit (the first flip flop) will change states when the first phase $t_1$ and the correct logic conditions exist. Up or DOWN command signals are applied to each stage as generated by sampler and control logic 34 shown in FIG. 3. If neither an UP nor a DOWN command signal is present, the counter will not count. The states of all stages are monitored to detect overflow (all 1's) and underflow (all 0's). The overflow signal is used to inhibit the counter from counting Up and the underflow signal to inhibit counting DOWN.

The two least significant stages 363 and 365 of a counter are shown in FIG. *7a*. Up or DOWN command signals are applied to AND-gates 362 and 364 respectively via conductors 366 and 368 respectively. The UP command from AND-gate 362 is supplied to all stages of the counter via line 374 provided an overflow inhibit signal is not present on line 370. Similarly the DOWN command from AND-gate 364 is applied to all stages of the counter via line 376 provided an underflow inhibit signal is not present on line 372.

Or gate 378 receives either the UP command signal or the DOWN command signal and produces an output on line 380 which is connected as one input to both AND-gates 382 and 384. Depending upon the state of flip flop 388, a "1" signal is coupled either to AND-gate 382 via line 390 or AND-gate 384 via line 392. Whenever a first time $t_1$ pulse occurs on line 394 as illustrated by waveform (1) in FIG. *7b*, an UP COMMAND OR A DOWN command signal passed by OR-gate 378 will also be passed either by AND-gate 382 or by 384 depending upon the state of flip flop 388. Thus flip flop 386 is either SET or RESET to a state opposite that of flip flop 388. The outputs of flip flops 386 on lines 396 and 398 are coupled to AND-gates 400 and 402 respectively. When the second phase pulse $t_2$ as shown by waveform (2) in FIG. *7b* occurs on line 404, either AND-gate 400 or AND-gate 402 will SET or RESET flip flop 388 to the same state as flip flop 386. The output of the least significant stage from flip flop 386 on line 406 is waveform (3) in FIG. *7b*. The complementary output is on line 408. The output from flip-flop 388 on line 392 is shown as waveform (4) in FIG. *7b* and is the same as waveform (3) delayed in time by an amount which is the difference of the time occurrence between the first and second phase pulses $t_1$ and $t_2$. the complementary output is on line 392.

AND-gates 410 and 412 are required between stages to couple the UP or DOWN commands to OR gate 414 whenever all lower order stages are producing ones (for UP commands) or zeros (for DOWN commands). Thus AND gates 410 and 412 will have an input from each lower order stage.

Flip flop 416 in stage 365 will produce an output on line 418 as shown by waveform (5) in FIG. *7b* and the complementary output on line 420. Also flip flop 422 in stage 365 will produce an output on line 424 as shown by waveform (6) in FIG. *7b* which is delayed with respect to waveform (5) by an amount which is the difference of the time occurrence between the first and second phase pulses $t_1$ and $t_2$.

If it is desired to inhibit counting on overflow or underflow, AND-gate 428, which has an inputs the delayed "1" outputs from all stages, or AND-gate 430, which has as inputs the delayed "0" outputs from all stages, must be included as shown in FIG. *7a*. When the stages of the counter store all "1's," an overflow indication will be present at the output of AND-gate 428 which is supplied as an inhibit input to AND-gate 362 via line 370. Underflow AND-gate 430 operates in a similar manner to provide an underflow indication on line 372 which is supplied as the inhibit input to AND-gate 364 via line 372. Obviously a manual RESET condition can be obtained by applying a signal to each flip flop in each stage of the counter.

A 7-bit counter is used in the AGC loop and an 8-bit counter is used in the DC level control loop. However, the number of bits specified is for purposes of example only and is not intended to be limiting. These counters are of the type just described. Both of these counters are inhibited from counting UP when an overflow condition exists and from counting DOWN when a underflow condition exists. Due to the inherent characteristics of logic circuits, there is a delay from the time a sample is taken by the circuitry in FIG. *6b* until the correct control signal is present on its output lines. Therefor to provide proper timing for the counters 36 and 38 in FIG. 3, the signal on line 326 in FIG. *6b* is delayed and applied to the counters as timing pulse $t_1$ as described above.

The only criteria for determining the time of occurrence of the second phase clock pulse $t_2$ is that it occurs prior to the next first phase $t_1$ pulse. The signal present on line 360 in FIG. *6b* satisfies this criteria and is therefore used.

The outputs of the gain control counter 36 are used to control the FET switches as shown and described in applicants commonly assigned abandoned application Ser. No. 606,721 filed Jan. 3, 1967. The outputs of the DC level control counter 38 are coupled to D/A converter 40 as previously described. The D/A converter 40 is conventional and is therefore not explained in detail.

I claim:

1. A signal conditioner for receiving an input pulse code modulated signal and for producing at an output terminal a demodulated output signal having a known DC baseline and a known amplitude over a wide dynamic range of the input signal variations, said signal conditioner comprising:

a. comparator means for establishing first and second voltage reference levels corresponding to the desired upper and lower levels of the output signal, the DC baseline being established at a point midway between said reference levels;

b. a variable gain amplifier circuit coupled to said comparator means and said output terminal for receiving said input signal and controlling one of the levels of said output signal in accordance with said first reference voltage level; and c. a DC baseline control circuit coupled to said comparator means and said output terminal for controlling the other level of said output signal in accordance with said second reference voltage level, whereby the amplitude and DC baseline of said output signal is controlled.

2. A signal conditioner as in claim 1 wherein said variable gain amplifier circuit comprises:

a. an amplifier having control circuits for receiving said input signal and producing an output that is a replica of the input signal except for a change in amplitude;

b. means coupling the output of said DC baseline control circuit to said comparator means for comparing said output signal with said reference voltage levels to produce outputs indicative of the polarity and magnitude of said output signal;

c. sampling means connected to the output of said comparator for temporarily storing digital values indicative of said polarity and magnitude of saioutput signal existing at various discrete times;

d. a reversible counter;

e. means coupling the output of said sampling means to said counter for causing said counter to count in a first direction if said sample is of a first polarity and greater than said first reference voltage level and to count in a second direction if said sample is of a first polarity and less than said first reference voltage level; and f. means coupling the output of said counter to said amplifier control circuits for varying the gain accordingly.

3. A signal conditioner as in claim 3 wherein said comparator means comprises:

a. first, second and third differential amplifiers each having first and second input terminals and an output terminal;

b. means connecting said output signal to said first input terminal of each of said first, second and third differential amplifiers;

c. voltage reference means for developing said first and second reference voltage levels and a third reference voltage level midway between said first and second reference voltage levels; and d. means connecting said voltage reference means to the second input terminals of said differential amplifiers, the arrangement being such that a voltage is produced at the output terminal of said first differential amplifier indicative of whether said output signal is greater than or less than said first refernece voltage, at the output terminal of said second differential amplifier indicative of whether said output signal is greater than or less than said second reference voltage level and at the output terminals of said third differential amplifier indicative of whether said output signal is positive or negative.

4. Apparatus as in claim 3 wherein said sampling means comprises:

a. first, second and third AND circuits each having a first terminal thereof adapted to be connected to a source of timing pulses and a second terminal individually connected to an output terminal of one of said differential amplifiers;

b. first, second and third flip-flop circuits each having a clear terminal adapted to be connected to said source of timing pulses and a set terminal connected to a respective output of one of said first, second and third AND circuits; and c. further locig circuit means connected to the set and clear outpus of said first, second and third flip-flops for generating counter control signals in accordance with the sampled value stored in said flip-flops.

5. A signal conditioner as in claim 2 wherein said DC baseline control circuit compries:

a. a DC amplifier coupled between said variable gain control amplifier circuit and said sampling means;

b. a second reversible counter for accumulating digital signals;

c. a digital-to -analog converter coupled to the output of said second counter for producing an analog output proportional to said digital value stored in said second counter;

d. means coupling the output of said sampling means to the input of said second counter for causing said second counter to count in a first direction if said sample is of a second polarity and greater in magnitude than said second reference voltage level and to count in a second direction if said sample is of a second polarity and less in magnitude than said second reference voltage level; and e. means coupling the output of said digital-to-analog converter to said DC amplifier for varying the DC baseline output accordingly.

* * * * *

UNITED STATES PATENT OFFICE
CERTIFICATE OF CORRECTION

Patent No. 3,851,266 Dated November 26, 1974

Inventor(s) Patrick H. Conway

It is certified that error appears in the above-identified patent and that said Letters Patent are hereby corrected as shown below:

IN THE PRINTED PATENT

Column 1, lines 7 and 8, after "now" insert -- abandoned -- and delete "U. S. Pat. No. 3467991".

IN THE CLAIMS

Claim 2, column 11, line 45, change "saiout-" to -- said out --.

Claim 3, column 11, line 1, change "claim 3" to -- claim 2 --.

Claim 3, column 12, line 19, change "nals" to -- nal -- .

Claim 4, column 12, line 34, change "locig" to -- logic -- .

Claim 4, column 12, line 35, change "outpus" to -- outputs -- .

Claim 5, column 12, line 40, change "compries" to -- comprises --

Signed and sealed this 11th day of February 1975.

(SEAL)
Attest:

RUTH C. MASON
Attesting Officer

C. MARSHALL DANN
Commissioner of Patents
and Trademarks